United States Patent [19]

Tanisake et al.

[11] Patent Number: 4,983,707
[45] Date of Patent: Jan. 8, 1991

[54] COPOLYESTER FROM 1,6-BIS(PHENOXY)HEXANE-4,4'-DICARBOXYLATE

[75] Inventors: Hiroka Tanisake; Koji Yamamoto; Toshizumi Hirota; Kazunobu Maruo, all of Hiratsuka, Japan

[73] Assignee: Mitsubishi Gas Chemical Company, Inc., Tokyo, Japan

[21] Appl. No.: 473,153

[22] Filed: Jan. 31, 1990

[30] Foreign Application Priority Data

Feb. 8, 1989 [JP] Japan .................................. 1-27478

[51] Int. Cl.$^5$ ...................... C08G 63/02; C08G 63/18
[52] U.S. Cl. .................................. 528/193; 528/125; 528/176; 528/190; 528/194
[58] Field of Search ............... 528/125, 176, 190, 193, 528/194

[56]  References Cited

U.S. PATENT DOCUMENTS

| 3,778,410 | 12/1973 | Kuhfuss ........................... 525/437 |
| 4,161,470 | 7/1979 | Calundann ....................... 524/599 |
| 4,605,727 | 8/1986 | Inoue et al. ...................... 528/194 |
| 4,663,422 | 5/1987 | Inoue et al. ...................... 528/176 |
| 4,906,724 | 3/1990 | Yamanaka et al. ............... 528/193 |

OTHER PUBLICATIONS

J. E. McIntyre, P. E. P. Maj *and J. G. Tomka "Thermotropic Polyesters:" Dept. Text. Ind., Univ. Leeds. 1989.

Primary Examiner—Harold D. Anderson
Assistant Examiner—T. Mosley
Attorney, Agent, or Firm—Wenderoth, Lind & Ponack

[57]  ABSTRACT

A melt-processable copolyester comprising:
a structural unit (I) of the formula (1),

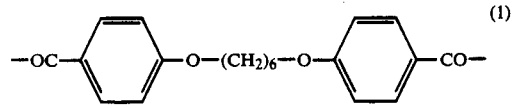 (1)

a structural unit (II) of the formula (2),

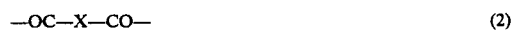 (2)

wherein X is at least one member selected from the group consisting of

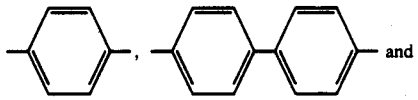 and

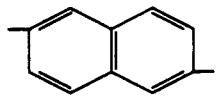

a structural unit (III) of the formula (3)

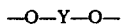

(3)

wherein Y is at least one member selected from the group consisting of

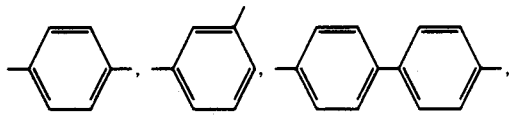

,

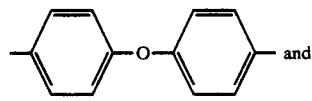 and

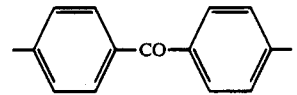

and
a structural unit (IV) of the formula (4)

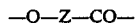

(4)

wherein Z represents at least one member selected from the group consisting of

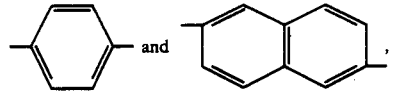

, the ratio of the structural unit (IV) (III) to the structural units [(I)+(II)+(III)+(IV)] in total being 5 to 80 mole%, the structural units [(I)+(II)] being substantially equimolar to the structural unit (III), the ratio of the structural unit (I) to the structural units [(I)+(II)] in total being 10 to 90 mole %, and the copolyester having an inherent viscosity (ln $\eta_{rel}$)/C, measured in a concentration of 0.16 g/dl in pentafluorophenol at 60° C., of not less than 0.3 dl/g.

6 Claims, No Drawings

COPOLYESTER FROM 1,6-BIS(PHENOXY)HEXANE-4,4'-DICARBOXYLATE

FIELD OF THE INVENTION

This invention relates to a novel copolyester which is melt-processable at a temperature below about 400° C. and which can give molded articles having excellent heat resistance and hydrolysis resistance.

PRIOR ART OF THE INVENTION

Aromatic polyesters such as polyethylene terephthalate, polybutylene terephthalate, etc., have high crystallizability and high softening point, and are excellent in view of mechanical strength, etc., and they have therefore been widely used in fibers, films, and other molded articles. However, they are not necessarily satisfactory concerning heat resistance.

With recent advancing technologies, there is an increasing demand for materials having higher performance, and a variety of polyesters having various novel performances have been developed and are already commercially available.

Above all, thermotropic liquid crystal polyesters, which exhibit optical anisotropy in a melt phase, attract attention from the viewpoint of excellent properties thereof.

Differing, to a great extent from conventional polyesters used widely in industry such as polyethylene terephthalate, polybutylene terephthalate, etc., the thermotropic liquid crystal polyesters have a molecular chain which does not bend easily even in a melt phase, or maintain a rod-like form. And when they are melted, the molecules are not much tangled one with another, and they exhibit a specific flow behavior of unidirectional orientation under a small shear stress, and even when they are cooled in the oriented state, they are solidified with maintaining the molecules in the oriented state. Thus, the thermotropic liquid crystal polyesters have excellent melt-processability, mechanical properties and heat resistance.

As a thermotropic liquid crystal polyester, there is known a wholly aromatic polyester derived from p-hydroxybenzoic acid and 6-hydroxy-2-naphthoic acid as main components, as is described in U.S. Pat. No. 4,161,470. This wholly aromatic polyester has excellent mechanical properties and heat resistance. Since, however, the 6-hydroxy-2-napthoic acid as the component is expensive and the resulting polymer is hence expensive, the expansion of use thereof is being prevented.

On the other hand, as shown in U.S. Pat. No. 3,778,410, a copolyester obtained by the polycondensation of polyethylene terephthalate under acidolysis with p-acetoxybenzoic acid is also known as a thermotropic liquid crystal, which can be melt-molded by using an ordinary injection molding machine used for molding polyethylene terephthalate, polybutylene terephthalate due to its low melt-processing temperature of about 240°–260° C., and which is relatively less expensive. However, this copolyester is not satisfactory in view of heat resistance since its heat distortion temperature is about 65°–70° C., and it also has another defect in that its hydrolysis resistance is inferior to those of wholly aromatic polyesters.

SUMMARY OF THE INVENTION

It is an object of this invention to provide a thermotropic liquid crystal polyester excellent in melt-processability.

It is another object of this invention to provide a thermotropic liquid crystal polyester excellent in mechanical properties.

Further, it is another object of this invention to provide a thermotropic liquid crystal polyester excellent in heat resistance and hydrolysis resistance.

It is yet another object of this invention to provide a thermotropic liquid crystal polyester which is excellent in economy.

According to this invention, there is provided a melt-processable copolyester comprising:
a structural unit (I) of the following formula (1),

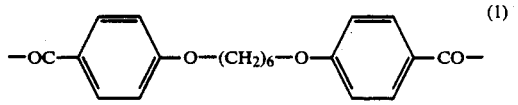

a structural unit (II) of the following formula (2), $$-OC-X-CO- \quad (2)$$

wherein X is at least one member selected from the group consisting of

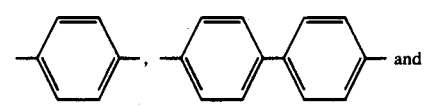

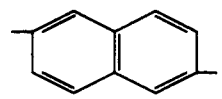

a structural unit (III) of the following formula (3)

$$-O-Y-O- \quad (3)$$

wherein Y is at least one member selected from the group consisting of

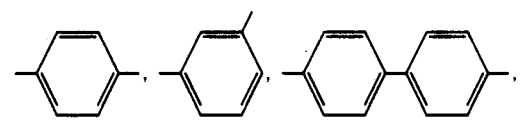

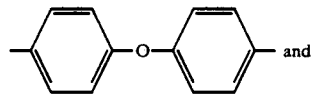

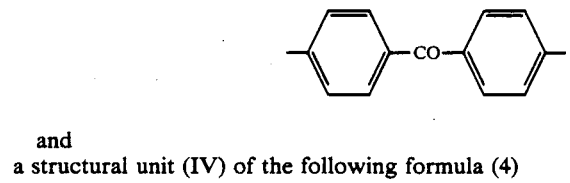

and
a structural unit (IV) of the following formula (4)

$$-O-Z-CO- \quad (4)$$

wherein Z represents at least one member selected from the group consisting of

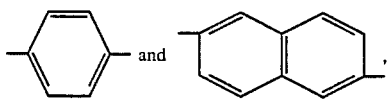

the ratio of the structural unit (IV) to the structural units [(I)+(II)+(III)+(IV)] in total being 5 to 80 mole %, the structural units [(I)+(II)] being substantially equimolar to the structural unit (III), the ratio of the structural unit (I) to the structural units [(I)+(II)] in total being 10 to 90 mole %, and the copolyester having an inherent viscosity (ln $\eta_{rel}$)/C, measured in a concentration of 0.16 g/dl in pentafluorophenol at 60° C., of not less than 0.3 dl/g.

DETAILED DESCRIPTION OF THE INVENTION

In the copolyester of this invention, the formula (1) for the structural unit (I) represents a moiety of 1,6-bis(phenoxy)hexane-4,4'-dicarboxylic acid.

No special limitation is imposed on the process for the production of the 1,6-bis(phenoxy)hexane-4,4'-dicarboxylic acid, and it may be produced, for example, by the following process.

First, methyl p-hydroxybenzoate or ethyl p-hydroxybenzoate and 1,6-hexane dichloride or 1,6-hexane dibromide are reacted in an aprotic polar solvent, such as dimethylformamide, in the presence of an alkali, such as sodium carbonate to form dimethyl 1,6-bis(phenoxy)-hexane-4,4'-dicarboxylate or diethyl 1,6-bis(phenoxy)-hexane-4,4'-dicarboxylate. Then, the above products are saponified with an alkali, e.g. potassium hydroxide, and further neutralized with hydrochloric acid, etc., whereby 1,6-bis(phenoxy)-hexane-4,4'-dicarboxylic acid is obtained.

The formula (2) for the structural unit (II) represents a moiety of terephthalic acid, 4,4'-biphenyldicarboxylic acid or 2,6-naphthalenedicarboxylic acid, and the structural unit (II) may be formed of one moiety of these or two or more moieties of these in combination.

The formula (3) for the structural unit (III) represents a moiety of 1,4-dihydroxybenzene, 1,3-dihydroxybenzene, 4,4'-dihydroxybiphenyl, 4,4'-dihydroxydiphenyl ether, or 4,4'-dihydroxybenzophenone, and the structural unit (III) may be formed of one moiety of these or two or more moieties of these in combination.

The formula (4) for the structural unit (IV) represents a moiety of p-hydroxybenzoic acid or 6-hydroxy-2-naphthoic acid, and the structural unit (IV) may be formed of one moiety of these or more moieties in combination.

In the copolyester of this invention, the ratio of the structural unit (IV) to the structural units [(I)+(II)+(III)+(IV)] in total is 5 to 80 mole %, preferably 10 to 70 mole %, more preferably 40 to 70 mole %, and the ratio of the structural unit (I) to the structural units [(I)+(II)] in total is 10 to 90 mole %, preferably 15 to 85 mole %.

The copolyester of this invention is melt-processable at temperature below 400° C., and makes it possible to easily obtain molded articles having excellent mechanical properties, heat resistance and hydrolysis resistance.

When the ratio of the structural unit (IV) to the structural units [(I)+(II)+(III)+(IV)] in total is lower than the above lower limit or higher than the above upper limit, resultant copolyesters have poor melt-processability, and the objects of this invention cannot be accomplished.

When the ratio of the structural unit (I) to the structural units [(I)+(II)] in total is lower than the above lower limit, resultant copolyesters have poor melt-processability, and the objects of this invention cannot be accomplished. When this ratio is higher than the above upper limit, resultant copolyesters have poor heat resistance, and the objects of this invention cannot be accomplished, either.

The copolyester of this invention has an inherent viscosity (ln $\eta_{rel}$)/C, measured in a concentration of 0.16 g/dl in pentafluorophenol at 60° C., of not less than 0.3 dl/g, preferably 0.5 to 8.0 dl/g. The copolyester of this invention having an inherent viscosity within this range has both excellent mechanical strength and excellent melt-processability.

The copolyester of this invention not only has better heat resistance and hydrolysis resistance than usual aromatic polyesters such as polyethylene terephthalate, etc., but also has better heat resistance and hydrolysis resistance than that liquid crystal polyester of U.S. Pat. No. 3,778,410 which is formed from polyethylene terephthalate and p-acetoxybenzoic acid. Further, the copolyester of this invention is less expensive than that liquid crystal wholly aromatic polyester of U.S. Pat. No. 4,161,470 which is formed from p-hydroxybenzoic acid and 6-hydroxy-2-naphthoic acid.

The copolyester of this invention can be produced according to a conventional polycondensation process used for producing usual polyesters. For example, it can be produced by reacting a 1,6-bis(phenoxy)hexane-4,4'-dicarboxylic acid or its ester which forms a moiety of the formula (1) for the structural unit (I), an aromatic dicarboxylic acid or its ester which forms a moiety of the formula (2) for the structural unit (II), an aromatic dihydroxy compound or its ester which forms a moiety of the formula (3) for the structural unit (III) and an aromatic hydroxycarboxylic acid or its ester which forms a moiety of the formula (4) for the structural unit (IV), thereby to form ester bonds in such a manner that the ratio of the unit (IV) to the units [(I)+(II)+(III)+(IV)] in total, the ratio between the units (I) and (II), and the ratio of the unit (III) to the units [(I)+(II)] in total come under the prescribed ranges. Typical examples of the production process include the following (a) and (b).

(a) Polycondensation of aromatic dicarboxylic acids, a diacetate of an aromatic dihydroxy compound and an acetate of an aromatic hydroxycarboxylic acid, during which acetic acids are removed. Examples of the polycondensation are: a reaction of 1,6-bis(phenoxy)hexane-4,4'-dicarboxylic acid, terephthalic acid, 4,4'-diacetoxydiphenyl ether and p-acetoxybenzoic acid; a reaction of 1,6-bis(phenoxy)hexane-4,4'-dicarboxylic acid, 2,6-naphthalenedicarboxylic acid, hydroquinone diacetate and p-acetoxybenzoic acid; a reaction of 1,6-bis(phenoxy)hexane-4,4-dicarboxylic acid, 4,4'-biphenyldicarboxylic acid, hydroquinone diacetate, p-acetoxybenzoic acid and 6-acetoxy-2-naphthoic acid; etc.

(b) Polycondensation of a diphenyl ester of aromatic dicarboxylic acids, an aromatic dihydroxy compound, a phenyl ester of an aromatic hydroxycarboxylic acid, during which phenols are removed. Examples of the polycondensation are: a reaction of diphenyl 1,6-bis(phenoxy)hexane-4,4'-dicarboxylate, diphenyl terephthlate, 4,4'-dihydroxybenzophenone and phenyl p-hydroxy-benzoate; a reaction of diphenyl 1,6-bis(-phenoxy)hexane-4,4'-dicarboxylate, diphenyl 2,6-naphthalenedicarboxylate, hydroquinone and phenyl-p-hydroxybenzoate; a reaction of diphenyl 1,6-bis(-phenoxy)hexane-4,4'-dicarboxylate, diphenyl 4,4'-biphenyldicarboxylate, 4,4'-dihydroxybiphenyl, phenyl p-hydroxybenzoate and phenyl-6-hydroxy-2-naphthoate; etc.

Among these processes, the process (a) is more desirable than the process (b) in that the polycondensation proceeds without any catalyst. The above process (b), however, can be carried out by using metal compounds such as stannous acetate, tetrabutyl-titanate, etc., as a catalyst for the polycondensation.

The copolyester obtained by this invention is melt-processable at temperature below 400° C., is capable of giving molded articles having excellent mechanical properties and resistance to heat and hydrolysis, and is industrially better than conventional thermotropic liquid crystal polyesters, e.g., those described in U.S. Pat. Nos. 4,161,470 and 3,778,410.

The copolyester of this invention may contain a filler, stabilizer, glass fiber, fire retardant and other additives.

EXAMPLES, COMPARATIVE EXAMPLES AND SYNTHESIS EXAMPLES

This invention will be explained in detail according to Examples hereinbelow, which, however, shall not limit the present invention.

The physical properties, etc., set forth in Example and Comparative Examples were evaluated in the following methods.

(1) Inherent viscosity

A copolyester was dissolved in pentafluorophenol such that the copolyester cocentration was 0.16 g/dl, and the solution was subjected to an Ubbelode capillary viscometer (in which the flow time of pentafluorophenol alone was 286 seconds) at 60°±0.01° C.

On the basis of a flow time obtained by the above measurement, $\eta_{rel}$ was determined, and the inherent viscosity [(In$\eta_{rel}$)/C] (dl/g) was calculated.

(2) Intrinsic viscosity

A copolyester was dissolved in phenol/tetrachloroethane mixed solvents (the weight ratio of phenol/tetrachloroethane was 60/40) such that the copolyester concentrations were 0.50 g/dl, 0.25 g/dl and 0.17 g/dl, and the solutions were subjected to an Ubbelode capillary viscometer (in which the flow time of said mixed solvent alone was 140 seconds) at 25°±0.01° C.

On the basis of flow times obtained by the above measurement, $\eta_{sp}$/C was determined and extrapolated into a concentration of zero, and the intrinsic viscosity was determined.

(3) Starting temperature of thermal decomposition: Td (°C.)

The starting temperature of thermal decomposition was measured by subjecting 4 mg of a sample to measurement using a thermal analyzer (model TG/DTA 200 manufactured by Seiko Electronics) in which dry air was under circulation (flow rate: 300 ml/min) and the temperature elevation rate was 10° C./min.

(4) Temperature indicating endotherm caused by the melting of a polymer: Tm (°C.)

This temperature was measured by subjecting 10 mg of a sample contained in a non-closed aluminum container to measurement using a differential scanning calorimeter (DSC, model: SSC/560S, manufactured by Seiko Electronics) in which nitrogen gas was under circulation (flow rate: 30 ml/min) and the temperature elevation rate was 20° C./min.

(5) Apparent melt viscosity

The apparent melt viscosity was measured by using a flow tester (model: CFT-500 made by Shimadzu Corporation), which had a die having a diameter of 1 mm and a length of 2 mm. The load was 10 kg or 50 kg.

(6) Optical anisotropy

Whether or not a polymer had optical anisotropy was observed by using a polarizing microscope Optiphoto-POL (manufactured by Nikon) equipped with a hot stage (manufactured by Metler).

[SYNTHESIS EXAMPLE]

The following is a process employed to produce 1,6-bis(phenoxy)hexane-4,4'-dicarboxylic acid used in the production of copolyesters in Examples.

Synthesis of 1,6-bis(phenoxy)hexane-4,4'-dicarboxylic acid

A 1-liter autoclave having a stirrer, thermometer, pressure gauge and nitrogen gas-introducing tube was charged with 91.2 g of methyl p-hydroxybenzoate, 46.6 g of 1,6-hexane dichloride, 600 ml of dimethylformamide and 34.9 g of sodium carbonate, and closed. The stirring of the mixture and temperature elevation were started, and the reaction was carried out at 120° C. for 7 hours. Thereafter, the temperature was elevated to 130° C. to continue the reaction for 7 hours, during which the autoclave had an internal pressure of 5 kg/cm².

The reaction liquid was cooled, a precipitate was filtered and a separated crude dimethyl 1,6-bis(phenoxy)hexane-4,4'-dicarboxylate was washed with water, and then with methanol to give 85.6 g of white plate-like crystals. 50 g of the white plate-like crystals were charged into a glass separable flask with a stirrer, thermometer and nitrogen gas-introducing tube, and 900 ml of ethyl alcohol and 52 g of sodium hydroxide were added. The mixture was heat-treated at 80° C. for 4 hours to saponify the dimethyl 1,6-bis(phenoxy)-hexane-4,4'-dicarboxylate. This treated liquid was neutralized by adding 2,000 ml of water and 100 ml of 35% hydrochloric acid to give a crude 1,6-bis(phenoxy)hexane-4,4'-dicarboxylic acid. This product was washed with water and filtered repeatedly to give 37 g of a high-purity 1,6-bis(phenoxy)hexane-4,4'-dicarboxylic acid (to be referred to as "BHB" hereinbelow).

EXAMPLE 1

A 50-milliliter reactor having a stirrer, thermometer, pressure gauge, nitrogen gas-introducing tube and a distillation head connected to a condenser was charged with 10.8 g (0.06 mole) of p-acetoxybenzoic acid, 3.88 g (0.02 mole) of hydroquinone diacetate, 5.38 g (0.015 mole) of "BHB" and 0.83 g (0.005 mole) of terephthalic acid, and a purge with nitrogen was carried out 3 times. Then, the mixture was heated up to 200° C. while a small amount of nitrogen was introduced into the reactor with stirring the mixture moderately. When the temperature of the mixture reached 200° C., the stirring rate was increased, and the temperature of the mixture was increased stepwise to carry out a reaction at 240° C. for 2 hours, at 260° C. for 2 hours, at 280° C. for 2 hours, at 300° C. for 1 hour, 320° C. for 1.5 hours and at 350° C. for 4 hours. The amount of acetic acid which had been distilled off was 4.9 g. Then, the pressure of the reaction vessel was gradually reduced, and while the pressure was maintained at a vacuum of 0.5 Torr, the reaction product was stirred at 350° C. for 4 hours to complete the polymerization, whereby a polymer (to be referred to as "A-1" hereinbelow) was obtained.

The polymer "A-1" had an inherent viscosity of 1.92. When this polymer was subjected to a differential scanning calorimeter (DSC), no clear endotherm was observed. This polymer exhibited optical anisotropy in a molten state.

EXAMPLE 2

The same reactor as that used in Example 1 was charged with 10.8 g (0.06 mol) of p-acetoxybenzoic acid, 5.41 g (0.02 mole) of 4,4'-diacetoxybiphenyl, 3.58 g (0.01 mole) of "BHB" and 1.66 g (0.01 mole) of terephthalic acid, and the procedure of Example 1 was repeated to carry out a reaction at 240° C. for 3 hours, at 250° C. for 3 hours, and at 280° C. for 4.5 hours. The amount of acetic acid which had been distilled off was 3.9 g. Then, the pressure of the reactor was gradually reduced, and while the pressure was maintained at a vacuum of 0.5 Torr, the reaction product was stirred at 280° C. for 3 hours, at 320° C. for 1 hour and at 350° C. for 1 hour to complete the polymerization, whereby a polymer (to be referred to as "A-2" hereinbelow) was obtained.

The polymer "A-2" had an inherent viscosity of 4.62. When this polymer was subjected to a differential scanning calorimeter (DSC), an endotherm at 314° C. was observed.

EXAMPLES 3~5

Example 2 was repeated except for the use, in place of 5.41 g (0.02 mol) of the 4,4'-diacetoxybiphenyl, of 5.73 g (0.02 mole) of 4,4'-diacetoxydiphenyl ether (Example 3), 5.97 g (0.02 mole) of 4,4'-diacetoxybenzophenone (Example 4) and 3.88 g (0.02 mole) of resorcinol diacetate (Example 5), whereby polymers "A-3" to "A-5" were obtained. Table 1 shows their inherent viscosities, DSC-measured temperatures indicating endotherm caused by melting thereof (Tm), and starting temperatures of thermal decomposition (Td).

EXAMPLE 6

The same reactor as that used in Example 1 was charged with 7.56 g (0.042 mol) of p-acetoxybenzoic acid, 4.14 g (0.018 mole) of 6-acetoxy-2-naphthoic acid, 3.88 g (0.02 mole) of hydroquinone diacetate, 3.58 g (0.01 mole) of "BHB" and 1.66 g (0.01 mole) of terephthalic acid, and the procedure of Example 1 was repeated to carry out a reaction at 240° C. for 2 hours and at 260° C. for 3.5 hours. The amount of acetic acid which had been distilled off was 4.9 g. Then, the pressure of the reactor was gradually reduced, and while the pressure was maintained at a vacuum of 0.5 Torr, the reaction product was stirred at 280° C. for 2 hours and at 300° C. for 3 hours to complete the polymerization, whereby a polymer (to be referred to as "A-6" hereinbelow) was obtained.

The polymer "A-2" had an inherent viscosity of 1.65. When this polymer was subjected to a differential scanning calorimeter (DSC), an endotherm at 275° C. was observed. This polymer exhibited optical anisotropy in a molten state.

EXAMPLES 7 and 8

Example 6 was repeated except for the use, in place of 3.88 g (0.02 mol) of the hydroquinone diacetate, of 5.73 g (0.02 mole) of 4,4'-diacetoxydiphenyl ether (Example 7) and 5.97 g (0.02 mole) of 4,4'-diacetoxybenzophenone (Example 8), whereby polymers "A-7" to "A-8" were obtained. Table 1 shows their inherent viscosities, DSC-measured temperatures indicating endotherm caused by melting thereof (Tm) and starting temperatures of thermal decomposition (Td).

EXAMPLE 9

The same reactor as that used in Example 1 was charged with 10.8 g (0.06 mol) of p-acetoxybenzoic acid, 3.88 g (0.02 mole) of hydroquinone diacetate, 3.58 g (0.01 mole) of "BHB" and 2.16 g (0.01 mole) of 2,6-naphthalenedicarboxylic acid, and the procedure of Example 1 was repeated to carry out a reaction at 240° C. for 3.5 hours, at 260° C. for 2 hours and at 280° C. for 1.5 hours. The amount of acetic acid which had been distilled off was 4.8 g. Then, the pressure of the reactor was gradually reduced, and while the pressure was maintained at a vacuum of 0.5 Torr, the reaction product was stirred at 280° C. for 3.5 hours and at 300° C. for 3 hours to complete the polymerization, whereby a polymer (to be referred to as "B-1" hereinbelow) was obtained.

The polymer "B-1" had an inherent viscosity of 2.56. When this polymer was subjected to a differential scanning calorimeter (DSC), an endotherm at 286° C. was observed. This polymer exhibited optical anisotropy in a molten state.

EXAMPLE 10

The same reactor as that used in Example 1 was charged with 10.8 g (0.06 mol) of p-acetoxybenzoic acid, 3.88 g (0.02 mole) of hydroquinone diacetate, 3.58 g (0.01 mole) of "BHB" and 2.42 g (0.01 mole) of 4,4'-biphenyldicarboxylic acid, and the procedure of Example 1 was repeated to carry out a reaction at 240° C. for 2 hours, at 260° C. for 2 hours, at 280° C. for 2 hours, at 300° C. for 1 hour and at 320° C. for 3 hours. The amount of acetic acid which had been distilled off was 4.9 g. Then, the pressure of the reactor was gradually reduced, and while the pressure was maintained at a vacuum of 0.5 Torr, the reaction product was stirred at 320° C. for 3 hours and at 330° C. for 3 hours to complete the polymerization, whereby a polymer (to be referred to as "B-2" hereinbelow) was obtained.

The polymer "B-2" had an inherent viscosity of 3.07. When this polymer was subjected to a differential scanning calorimeter (DSC), an endotherm at 355° C. was observed. This polymer exhibited optical anisotropy in a molten state.

EXAMPLES 11~14

Example 10 was repeated except for the use, in place of 3.88 g (0.02 mol) of the hydroquinone diacetate, of 5.41 g (0.02 mole) of 4,4'-diacetoxybiphenyl (Example 11), 5.73 g (0.02 mole) of 4,4'-diacetoxydiphenyl ether (Example 12), 5.97 g (0.02 mole) of 4,4'-diacetoxybenzophenone (Example 13) and 3.88 g (0.02 mole) of resorcinol diacetate (Example 14), whereby polymers "B-3" to "B-6" were obtained. Table 2 shows their inherent viscosities, DSC-measured temperatures indicating endotherm caused by melting thereof (Tm) and starting temperatures of thermal decomposition (Td).

Table 3 shows elemental analysis values of the polymers obtained in Examples 1 to 14. The values in "O(%)" in Table 3 were calculated by deducting values for C(%) and H(%) from 100%.

Table 4 shows apparent melt-viscosities of the polymers obtained in Examples 1 to 14.

COMPARATIVE EXAMPLE 1

A 5-liter autoclave having a stirrer, thermometer, pressure gauge, nitrogen gas-introducing tube, distillation head connected to a condenser, etc., was charged with 1,495 g (9.0 moles) of terephthalic acid and 838 g (13.5 moles) of ethylene glycol in this order, and the stirring of the mixture at a slow speed was started. After a purge with nitrogen was carried out three times, the internal pressure of the reactor was adjusted to 2 kg/cm$^2$ with nitrogen, and while the mixture was stirred at 200 rpm, the heating of the mixture was started.

Care being taken not to allow the internal pressure to exceed 2.5 kg/cm$^2$, a dehydration-condensation reaction was carried out between 215° C. and 240° C. to give an initial condensate. 1.3 g of triphenylphosphite and 0.4 g of germanium dioxide were added to the initial condensate, and the mixture was stirred for about 5 minutes and then transferred to a 5-liter condensation reactor.

The mixture was heated while it was stirred, and when the temperature reached 280° C., the pressure was reduced gradually to 0.5 Torr for about 30 minutes. While the vacuum degree was maintained at not more than 0.5 Torr, a polycondensation reaction was carried out, and when a prescribed torque was reached, the reaction was stopped, whereby a polyethylene terephthalate "C-1" was obtained. The polyethylene terephthalate C-1 had an intrinsic viscosity of 0.62 and a terminal carboxyl group concentration of 18.7 eq/10$^6$ g. Table 1 also shows its Td and DSC-measured temperature (Tm) indicating endotherm caused by melting thereof.

COMPARATIVE EXAMPLE 2

A 300-milliliter reactor having a stirrer, thermometer, pressure gauge, nitrogen gas-introducing tube, distillation head connected to a condenser, etc., was charged with 76.8 g of "C-1" and 108 g of p-acetoxybenzoic acid, and a purge with nitrogen was carried out three times.

While this mixture was stirred under a nitrogen atmosphere at 275° C., a reaction thereof was carried out to remove acetic acid. Then, the reaction mixture was subjected to a polycondensation reaction for 4 hours under a vacuum of not more than 0.5 Torr to give a polyester "C-2" having an intrinsic viscosity of 0.59 and a terminal carboxylic acid concentration of 149 eq/10$^6$ g. This polymer exhibited optical anisotropy in a molten state.

Table 1 shows its Td and DSC-measured temperature (Tm) indicating heat absorption caused by melting thereof.

Tables 1 and 2 clearly show that the polymers "A-1" to "A-8" and "B-1" to "B-8" had excellent heat resistance over the polymers "C-1" and "C-2".

TABLE 1

| | | | Polyester Material formulation (molar ratio) *2 | | | | | | | Copolyester | | |
|---|---|---|---|---|---|---|---|---|---|---|---|---|
| | No. | BHB | TA | HQDA | DABP | DADE | DABE | REDA | ABA | ANA | Tm (°C.) | Td (°C.) |
| Example | | | | | | | | | | | Inherent Viscosity | |
| 1 | A-1 | 15 | 5 | 20 | | | | | 60 | | 1.92 | *1 | 407 |
| 2 | A-2 | 10 | 10 | | 20 | | | | 60 | | 4.62 | 314 | 401 |
| 3 | A-3 | 10 | 10 | | | 20 | | | 60 | | 3.44 | 335 | 405 |
| 4 | A-4 | 10 | 10 | | | | 20 | | 60 | | 1.38 | 255 | 405 |
| 5 | A-5 | 10 | 10 | | | | | 20 | 60 | | 2.14 | 345 | 404 |
| 6 | A-6 | 10 | 10 | 20 | | | | | 42 | 18 | 2.54 | 257 | 423 |
| 7 | A-7 | 10 | 10 | | 20 | | | | 42 | 18 | 4.88 | 223 | 425 |
| 8 | A-8 | 10 | 10 | | | 20 | | | 42 | 18 | 2.85 | *1 | 402 |
| Comparative Example | | | | | | | | | | | (Intrinsic viscosity) | |
| 1 | C-1 | Polyethylene terephthalate | | | | | | | | | (0.62) | 260 | 387 |
| 2 | C-2 | Polyethylene terephthalate/ABA = 40/60 (molar ratio) | | | | | | | | | (0.59) | 200 | 397 |

Note 1: *1 = Not detectable
Note 2: *2
BHB: 1,6-bis(phenoxy)hexane-4,4'-dicarboxylic acid
TA: terephthalic acid
HQDA: hydroquinone diacetate
DABP: 4,4'-diacetoxybiphenyl
DADE: 4,4'-diacetoxydiphenyl ether
DABE: 4,4'-diacetoxybenzophenone
REDA: resorcinol diacetate
ABA: p-acetoxybenzoic acid
ANA: 6-acetoxy-2-naphthoic acid
Tm: DSC-measured temperature indicating endotherm caused by melting of a polymer
Td: Starting temperature of thermal decomposition

TABLE 2

| | | | | Polyester Material formulation (molar ratio) *2 | | | | | | | Copolyester | | |
|---|---|---|---|---|---|---|---|---|---|---|---|---|---|
| Example | No. | BHB | NDC | BPDC | HQDA | DABP | DADE | DABE | REDA | ABA | Inherent Viscosity | Tm (°C.) | Td (°C.) |
| 9 | B-1 | 10 | 10 | | 20 | | | | | 60 | 2.56 | 286 | 416 |
| 10 | B-2 | 10 | | 10 | 20 | | | | | 60 | 3.07 | 355 | 415 |
| 11 | B-3 | 10 | | 10 | | 20 | | | | 60 | 1.96 | 269 | 404 |
| 12 | B-4 | 10 | | 10 | | | 20 | | | 60 | 0.87 | *1 | 406 |
| 13 | B-5 | 10 | | 10 | | | | 20 | | 60 | 2.73 | *1 | 407 |

TABLE 2-continued

| Example | No. | BHB | NDC | BPDC | HQDA | DABP | DADE | DABE | REDA | ABA | Copolyester Inherent Viscosity | Tm (°C.) | Td (°C.) |
|---|---|---|---|---|---|---|---|---|---|---|---|---|---|
| 14 | B-6 | 10 | | 10 | | | | | 20 | 60 | 2.27 | *1 | 401 |

Note 1: *1 = Not detectable
Note 2: *2
BHB: 1,6-bis(phenoxy)hexane-4,4'-dicarboxylic acid
NDC: 2,6-naphthalenedicarboxylic acid
BPDC: 4,4'-biphenyldicarboxylic acid
HQDA: hydroquinone diacetate
DABP: 4,4'-diacetoxybiphenyl
DADE: 4,4'-diacetoxydiphenyl ether
DABE: 4,4'-diacetoxybenzophenone
REDA: resorcinol diacetate
ABA: p-acetoxybenzoic acid
Tm: DSC-measured temperature indicating endoterm caused by melting of a polymer
Td: Starting temperature of thermal decompositon

TABLE 3

| Polyester No. | Calculated | | | Found | | |
|---|---|---|---|---|---|---|
| | C (%) | H (%) | O (%) | C (%) | H (%) | O (%) |
| A-1 | 70.96 | 4.33 | 24.71 | 70.53 | 4.13 | 25.34 |
| A-2 | 73.05 | 4.17 | 22.78 | 73.02 | 4.12 | 22.86 |
| A-3 | 71.57 | 4.09 | 24.34 | 71.28 | 4.10 | 24.62 |
| A-4 | 72.00 | 4.03 | 23.98 | 71.54 | 4.07 | 24.39 |
| A-5 | 70.69 | 4.05 | 25.26 | 69.88 | 4.02 | 26.10 |
| A-6 | 72.22 | 4.05 | 23.73 | 71.22 | 3.96 | 24.82 |
| A-7 | 74.31 | 4.17 | 21.52 | 74.93 | 4.21 | 20.85 |
| A-8 | 72.89 | 4.09 | 23.03 | 73.45 | 4.20 | 22.35 |
| B-1 | 71.56 | 4.05 | 24.39 | 71.35 | 3.93 | 24.72 |
| B-2 | 71.93 | 4.12 | 23.95 | 71.87 | 4.12 | 24.01 |
| B-3 | 74.07 | 4.23 | 21.71 | 73.55 | 4.27 | 22.18 |
| B-4 | 72.63 | 4.15 | 23.22 | 72.52 | 4.08 | 23.40 |
| B-5 | 73.03 | 4.09 | 22.89 | 73.07 | 3.98 | 22.95 |
| B-6 | 71.93 | 4.12 | 23.95 | 72.43 | 4.00 | 23.57 |

TABLE 4

| Polyester No. | Measurement temperature (°C.) | Load (kg) | Melt-viscosity (poise) |
|---|---|---|---|
| A-1 | 350 | 50 | 167,000 |
| A-2 | 330 | 10 | 7,760 |
| A-3 | 350 | 10 | 24,700 |
| A-4 | 300 | 10 | 3,870 |
| A-5 | 350 | 10 | 9,390 |
| A-6 | 280 | 10 | 6,840 |
| A-7 | 280 | 10 | 286 |
| A-8 | 280 | 10 | 42,500 |
| B-1 | 280 | 10 | 1,310 |
| B-2 | 350 | 50 | 434 |
| B-3 | 280 | 10 | 223 |
| B-4 | 350 | 50 | 183,000 |
| B-5 | 350 | 50 | 440 |
| B-6 | 350 | 50 | 142,500 |

What is claimed is:

1. A melt-processable copolyester comprising:
a recurring structural unit (I) of the following formula (1),

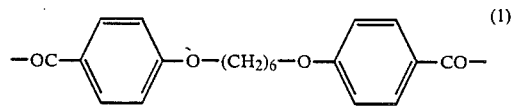
(1)

a recurring structural unit (II) of the following formula (2),

—OC—X—CO— (2)

wherein X is at least one member selected from the group consisting of

a recurring structural unit (III) of the following formula (3)

—O—Y—O— (3)

wherein Y is at least one member selected from the group consisting of

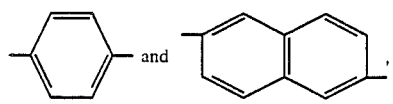

a recurring structural unit (IV) of the following formula (4)

—O—Z—CO— (4)

wherein Z represents at least one member selected from the group consisting of

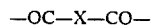

the ratio of the recurring structural unit (III) to the recurring structural units [(I)+(II)+(III)+(IV)] in total being 5 to 80 mole % the recurring structural units [(I)+(II)] being substantially equimolar to the recurring structural unit (III), the ratio of the recurring structural unit (I) to the recurring structural units [(I)+(II)] in total being 10 to 90 mole %, and the copolyester having an inherent viscosity (ln $\eta_{rel}$)/C, measured in a concentration of 0.16g/dl in pentafluorophenol at 60° C., of not less than 0.3 dl/g.

2. A copolyester according to claim 1 which has an inherent viscosity in the range of from 0.5 to 8.0.

3. A copolyester according to claim 1 wherein the ratio of the structural unit (IV) to the structural units [(I)+(II)+(III)+(IV)] in total is 40 to 70 mole, %.

4. A copolyester according to claim 1 wherein the ratio of the structural unit (I) to the structural units [(I)+(II)] is 15 to 85 mole %.

5. A copolyester according to claim 1 wherein X in the formula (2) for the structural unit (II) is

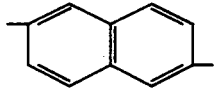

and Y in the formula (3) for the structural unit (III) and Z in the formula (4) for the structural unit (IV) each represent

6. A copolyester according to claim 1 wherein X in the formula (2) for the structural unit (II) is

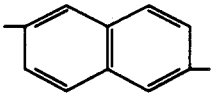

Y in the formula (3) for the structural unit (III) is at least one member selected from the group consisting of

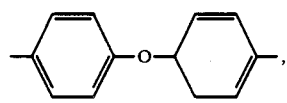

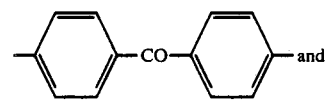

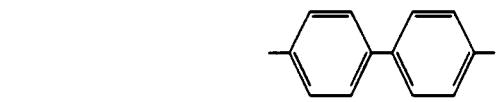

and Z in the formula (4) for the structural unit (IV) is

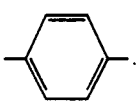

* * * * *